J. W. SHEPERDSON

METHOD OF AND APPARATUS FOR THE MANUFACTURE AND CONDITIONING OF SKELP

3 Sheets-Sheet 1

March 31, 1931. Original Filed Aug. 22, 1927 Re. 18,015

Inventor
John W. Sheperdson
By Geo. A. Kennedy
Attorney

J. W. SHEPERDSON

METHOD OF AND APPARATUS FOR THE MANUFACTURE AND CONDITIONING OF SKELP

3 Sheets-Sheet 2

March 31, 1931. Original Filed Aug. 22, 1927 Re. 18,015

Inventor
John W. Sheperdson
By Geo. H. Kennedy
Attorney

J. W. SHEPERDSON

METHOD OF AND APPARATUS FOR THE MANUFACTURE AND CONDITIONING OF SKELP

3 Sheets-Sheet 3

March 31, 1931. Original Filed Aug. 22, 1927 Re. 18,015

Inventor
John W. Sheperdson
By Geo. H. Kennedy Jr.
Attorney

Reissued Mar. 31, 1931

Re. 18,015

UNITED STATES PATENT OFFICE

JOHN W. SHEPERDSON, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS

METHOD OF AND APPARATUS FOR THE MANUFACTURE AND CONDITIONING OF SKELP

Original No. 1,782,700, dated November 25, 1930, Serial No. 214,703, filed August 22, 1927. Application for reissue filed January 28, 1931. Serial No. 511,886.

The present invention relates to the preparation of the metal stock, known as "skelp", which is used in the manufacture of pipes, such stock, as is well known, being rolled in flat, elongated strip or bar form, and being subsequently curved transversely on a mandrel, or in a suitable die, to permit the welding together of its opposite longitudinal edges, to form an elongated pipe or tube.

In order to adapt such skelp bar to the above-described operation of forming it into pipe, it is necessary that the front end of each piece be suitably pointed, cupped and bent, and the present invention resides in a novel method for continuously securing such pointing, cupping and bending on successive longitudinally-moving pieces of skelp bar,—for example, in their passage from the rolling mill to the cooling bed, or other receiving device, on which they are assembled, preparatory to manufacture into pipe. The invention also resides in the novel combinations and arrangements of apparatus by which the above results are obtained. Other and further objects and advantages of the invention will appear from the following detailed description thereof, reference being had in this connection to the accompanying drawings, in which—

Fig. 1 is a plan view, showing a portion of the apparatus employed in the invention.

Fig. 1*a* is a similar plan view of the remainder of the apparatus, being a continuation from the left hand end of Fig. 1.

Figure 1A:
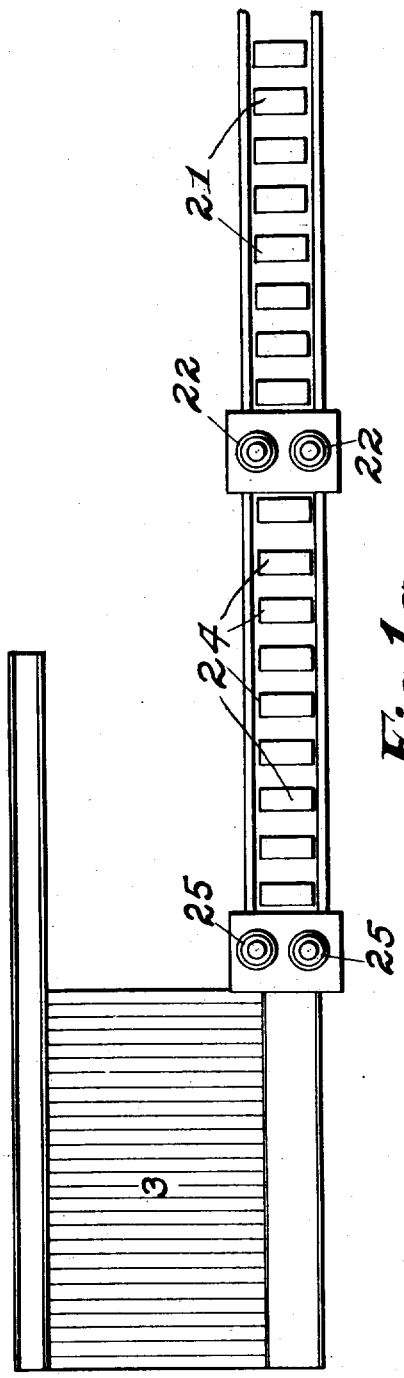
Figure 1:
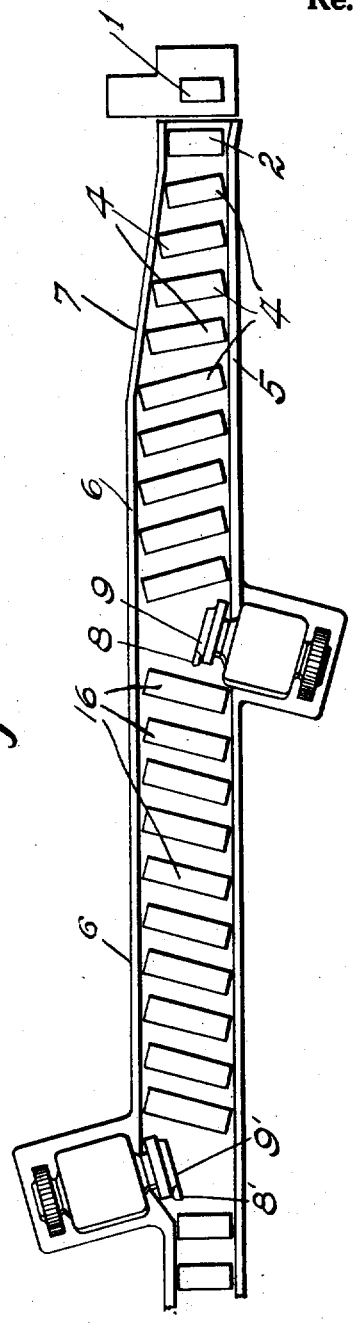
Figure 8:
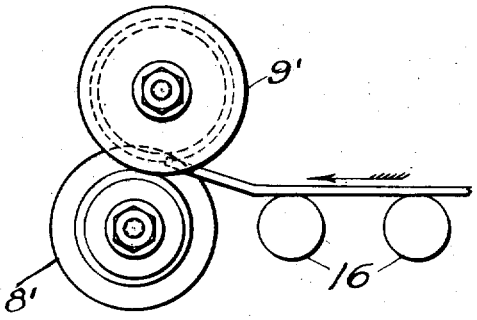
Figure 8A:
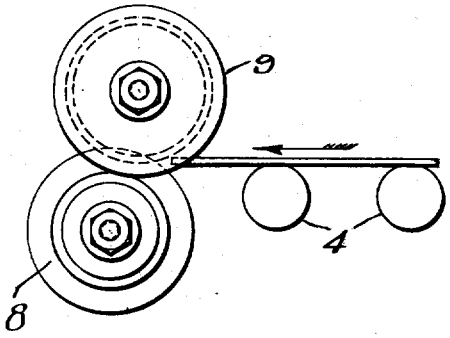

Figs. 8 and 8*a* are enlarged fragmentary views showing the relative elevations of the two sets of cutter rolls shown in Fig. 1.

Like reference characters refer to like parts in the different figures.

In the art as now practiced, the pointing, cupping and bending of skelp bar involves considerable hand labor and is a slow and tedious process. The skelp bar, upon delivery from the rolling mill, is cut to the desired lengths by the usual sheer, and then this partially finished product is assembled on a cooling bed or the like,—being piled up flatwise, in packs or stacks, for cooling. After cooling, each piece has to be individually presented to a special shearing and pressing device, which cuts off the corners of each front end, thereby to "point" the piece, and simultaneously cups and bends said end to the desired form. All this preparation involves considerable hand labor and interposes a proportionately long delay before the stock can be reheated for presentation to the usual pipe forming instrumentalities.

According to the present invention, all the preparatory operations of pointing, cupping and bending the skelp bars are performed prior to the above-described assembly of the bars, and preferably as continuations of the rolling process, the apparatus being so arranged that each successive piece cut off by the usual shear may be subjected, on its way to the cooling bed, to the necessary pointing, cupping and bending as an incident of its forward movement, with the result that the packs or piles of bars formed on said bed, instead of being composed of pieces that must be subsequently pointed, cupped and bent, are composed of pieces that are already pointed, cupped and bent, and ready to be made into pipe. The method which secures this result and an arrangement of apparatus adapted to carry out said method will now be described in detail.

Referring to Fig. 1, the numeral 1 represents diagrammatically the usual shear for cutting into the desired lengths the finished stock as it emerges from the final reducing rolls, not shown, of a skelp bar mill. One or more high speed conveyor rolls 2 of ordinary construction are placed beyond the shear 1, and serve in the manner well-known to project the successively cut-off pieces, in adequately spaced relation, onto means which are interposed between the conveyor rolls 2 and a cooling bed 3, Fig. 1*a*; said interposed means act on each piece so forwarded, in such a manner as to point, cup and bend its front end before the cooling bed is reached, so that the skelp which is received on said cooling bed needs no further preparation.

Said interposed means are here shown as comprising, firstly, a series of rotating skewed rolls 4, 4, with their axes so disposed with reference to the line of delivery of the skelp bars as to move the material into edgewise contact with a side guide 5.

The side guide 5 and opposite side guide 6, having an entrance portion 7, extend adjacent the ends of said skewed rolls 4, 4 and forwardly in similar relation to the ends of other subsequent series of skewed rolls, as hereinafter described.

Figure 5:
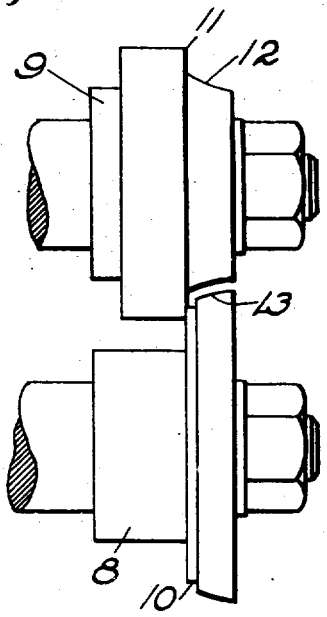
Fig. 5 is an enlarged fragmentary view of certain cutter discs employed in the apparatus of Fig. 1.
Figure 6:
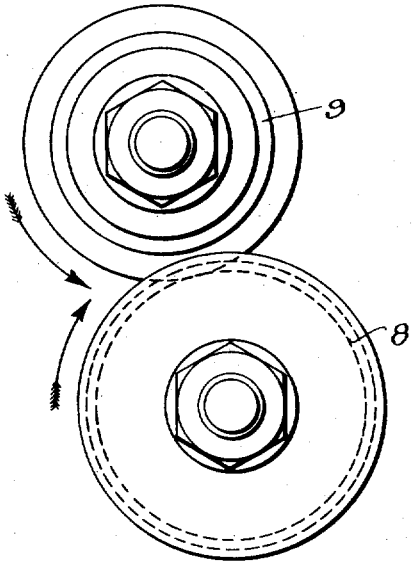
Fig. 6 is an end view of the rolls shown in Fig. 5.

As carried forward by the rolls 4, 4, in edgewise contact with the side guide 5, each piece of skelp bar has its front end introduced into the bite of a pair of rotating cutter dics 8, 9, the latter being of the special construction shown in Figs. 5 and 6, and overhanging the side guide 5, as shown in Fig. 1, with their axes diagonal to said side guide. These cutter discs 8 and 9 are rotated in unison but in opposite directions at high speed, by any suitable means, their shafts being geared together, as shown in Fig. 1. The lower cutter disc 8 provides a cutting or shearing flange 10 for cooperation with a cutting edge 11 of upper cutter disc 9, the latter, beyond said edge 11, having a concave extension 12 in matching relation to a convex extension 13 beyond the flange 10 of cutter disc 8. As shown in Figs. 1 and 6, the axis of the lower cutter disc 8 is advanced with respect to the axis of the upper roll 9, for a purpose to be hereinafter described.

Figures 2, 3, 4:
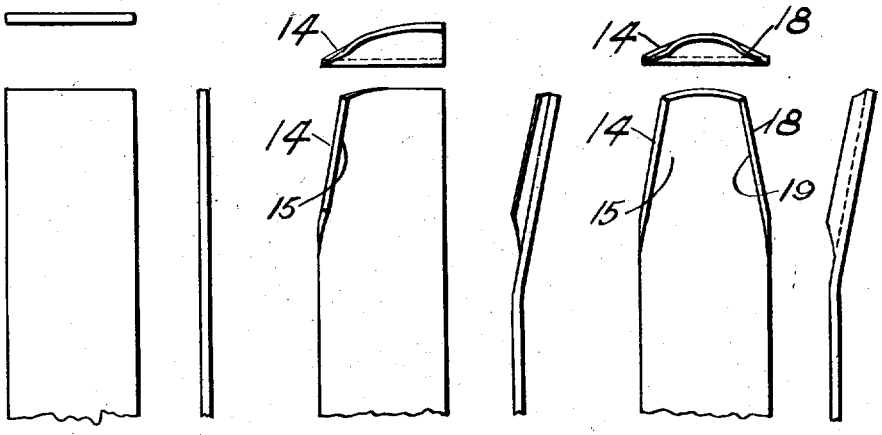
Fig. 2 is a combined underneath, side, and end view of the front end of the stock, as delivered to the apparatus of my invention.
Fig. 3 is a similar view of the stock, as acted upon by a portion of the apparatus.
Fig. 4 is a similar view of the stock in the form that it is delivered to the cooling bed, or other receiving device.

The action of the skewed cutter discs 8 and 9 on the front end of each piece is to cause a combined forward and sidewise movement of said end away from said guide 5, simultaneously with the severance effected by the cooperating edges 10 and 11, the result being that one front corner of the piece as shown in Fig. 3 is clipped off, by a cut extending diagonally from the front edge to the side edge of the piece to produce the result shown at 14 in Fig. 3; at the same time, this diagonal edge 14 is cupped downwardly, as shown at 15, by the cooperating extensions 12 and 13 of the rolls. And furthermore, this pointing and cupping is accompanied by a definite upward bend of the material for the length of said diagonal edge 14, owing to advancement of the lower cutter disc's axis above described, which allows the bite of said rolls 8 and 9 to be above the plane of travel of the stock on rolls 4, 4.

The action of skewed cutter discs 8 and 9, effecting sidewise movement of each piece toward the side guide 6, is continued by a series of skewed conveyor rolls 16, 16, so positioned as to act on each piece as it is delivered from the rotary cutting discs 8 and 9. These rolls 16, 16, have their axes oppositely skewed to the axes of said rolls 4, 4, and in consequence each piece is bodily transferred into edgewise contact with the side guide 6. These rolls 16, 16 project the front end of the piece into the bite of another set or pair of pointing, cupping, and bending cutter discs, designated 8′, 9′, which are of the same construction and arrangement as the cutter discs 8 and 9, but which overlie the side guide 6, and are skewed oppositely to the cutter discs 8 and 9. Said discs 8′ and 9′ are at a slightly higher elevation than the preceding cutter discs 8 and 9, as shown in Figs. 8 and 8*a*, to aline the bite of said rolls 8′ and 9′ with the previously bent-up front end of the piece.

Figure 7:
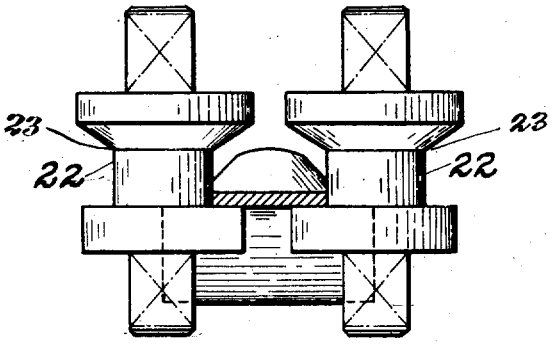
Fig. 7 is an enlarged fragmentary view of certain rolls employed in Fig. 1*a*.

As before, the action of these cutter discs 8′ and 9′ is to clip off a corner of said front end, this time the corner opposite to the one previously clipped off, so as to produce a diagonal edge 18, which is simultaneously curled downwardly, as shown at 19, Fig. 4. This operation completes the pointing, cupping and bending of the piece as an incident of its continuous forward movement from the shear 1 to the cooling bed 3, said piece, in the condition shown in Fig. 4, now passing onto conveyor rolls 21, Fig. 1*a*, which secure its continued forward movement. The stock, now in condition for piling or packing on the cooling bed 3, must have its speed very appreciably reduced from the high speed prevailing in the pointing and cupping or curling operation; it is now proposed, as an incident to its speed reduction, to "shingle" the successive pieces as they are forwarded longitudinally to the cooling bed. Ordinary horizontal pinch rolls to effect this shingling and speed reduction would operate to flatten out the cupped and bent front ends of the skelp bars, and therefore vertical rolls, 22, 22, for this purpose are employed, said rolls being grooved, as shown at 23, 23, Fig. 7, with the peripheral portions of said grooves spaced apart by the width of each bar behind its pointed front end. The bottom of each groove forms a vertical rotating plane by which the outer edge of the stock is carried forward, without effecting any sidewise or vertical restraint to disturb the cupped or arced point of the piece. By driving the rolls 22, 22 at a suitable speed from any suitable driving means, not shown, each piece of stock will be delivered onto the slower conveyor rolls 24, 24 just ahead, with its first end lapped over the last end of the previously delivered piece, in shingled relation.

Beyond the slow conveyor rolls 24, 24 are disposed another set of vertical grooved rolls 25, 25, preferably of the same construction and arrangement as the rolls 22, and operating to project each piece onto the cooling bed 3, where its front end brings up against a suitable stop. These rolls 25, 25 pile the bars flatwise on the cooling bed in pack formation, and upon the completion of such a pack, containing the desired number of bars, the same is adapted to be moved broadside on the cooling bed by any well known means, not shown. This completes the preparation of the skelp bars for the pipe making process,—the operation being a continuous and uninterrupted one, as to each bar, from the time it leaves the finishing rolls of the mill.

I claim:

1. In the manufacture of skelp, the improvement which consists in continuing the forward longitudinal movement of successively cut-off pieces of the rolled product of a skelp bar mill, and during such forward longitudinal movement subjecting the front end of each piece to pointing, cupping and bending operations, in the travel thereof from said mill to a cooling bed or other receiving device.

2. In the manufacture of skelp, the improvement which consists in imparting longitudinal movement to successively cut-off pieces of the rolled product of a skelp bar mill, and during said movement cutting off first one corner and then the other corner of the front end of each piece.

3. In the manufacture of skelp, the improvement which consists in imparting longitudinal movement to successively cut-off pieces of the rolled product of a skelp bar mill, and during such movement subjecting the first end of each piece to the action successively of oppositely skewed cutting rollers.

4. In the manufacture of skelp, the improvement which consists in initially forwarding each piece of the rolled material, while maintaining one longitudinal edge thereof in contact with a side-guide, then severing it obliquely between the front edge and said longitudinal edge while shifting it broadside into longitudinal edgewise contact with an opposite side guide, and finally severing it obliquely between the front edge and its other longitudinal edge.

5. In the manufacture of skelp, the improvement which consists in subjecting first one front corner and then the opposite front corner of successively cut-off pieces of the rolled product of a skelp bar mill to oblique severance and simultaneous cupping, in the continuous longitudinal travel thereof from a rolling mill to a cooling bed.

6. In the manufacture of skelp, the improvement which consists in first subjecting to pointing, cupping and bending operations, the front ends of successively cut-off pieces of the rolled stock in the continuous longitudinal movement of said pieces between the cutting-off mechanism and a cooling bed, then shingling the pieces so operated upon during said longitudinal movement, and finally assembling them by said movement in packs or piles on said cooling bed.

7. In apparatus of the class described, means for initially procuring longitudinal movement of successive pieces of skelp bar in a predetermined path, a pair of rotating cutter discs in said path having their axes skewed with reference thereto, thereby to sever obliquely one front corner of each piece and simultaneously to shift each piece broadside, means for continuing the longitudinal movement of each piece in a predetermined path offset from said first-mentioned path, and a second pair of rotating cutter discs in said second path having their axes skewed with reference thereto, thereby to sever obliquely the other front corner of each piece.

8. In apparatus of the class described, the combination with means for continuously forwarding successive pieces cut off from the rolled product of a skelp bar mill, of a pair of devices encountered successively by each piece in its forward movement, each said device operating to sever one front corner of said piece and to cup the severed edge, and said two devices cooperating to bend the front end so pointed and cupped.

9. In apparatus of the class described, the combination with means for continuing the forward longitudinal movement of successively cut-off pieces of the rolled product of a skelp bar mill, of a cutting device on each side of the path of said pieces and obliquely disposed thereto, said cutting devices being successively encountered by the opposite front corners of each piece, as the latter moves forward for the "pointing" of said piece by the severance of said corners.

10. In apparatus of the class described, the combination with means for continuing the forward longitudinal movement of successively cut-off pieces of the rolled product of a skelp bar mill, of a set of skewed cutting rollers on either side of the path of said pieces, for operation successively on the opposite front corners of each piece, to remove said corners and thereby "point" the front end of the piece.

11. In apparatus of the class described, the combination with means for continuing the forward longitudinal movement of successively cut-off pieces of the rolled product of a skelp bar mill, of a set of skewed cutting rollers on either side of the path of said pieces, for operation successively on the opposite front corners of each piece, to remove said corners and thereby "point" the front end of the piece, said cutting rollers having cooperating portions, adjacent their cutting edges, for imparting a downward "cup" to the material along each edge so severed.

12. In apparatus of the class described, the combination with means for continuing the forward longitudinal movement of successively cut-off pieces of the rolled product of a skelp bar mill, of a set of skewed cutting rollers on either side of the path of said pieces, for operation successively on the opposite front corners of each piece, to remove said corners and thereby "point" the front end of each piece, each set of cutting rollers having its plane of severance above the normal plane of travel of the piece, thereby to impart an upward bend to the front end of said piece for the length of the severed edges thereof.

13. In apparatus of the class described, the combination with means for continuing the forward longitudinal movement of successively cut-off pieces of the rolled product of a skelp bar mill, of means encountered successively by each piece in its said forward movement for pointing, cupping, and bending the front end of said piece, means for shingling the pieces so pointed, cupped and bent by the continuance of said longitudinal movement, and means responsive to such movement and to such shingling for assembling said pieces in packs or piles on a cooling bed.

14. In apparatus of the class described, the combination with a set of skewed conveyor rolls for continuing the forward movement of successively cut-off pieces of the rolled product of a skelp bar mill, a side guide against which one longitudinal edge of each piece is maintained, by the action of said skewed rollers, a cutting device overhanging said side guide and disposed obliquely thereto, for the severance of a front corner from each piece, a second set of skewed conveyor rollers for continuing the forward movement of each piece after such severance, said second set of rollers being skewed oppositely to those of the first set, whereby the piece, in its continued forward movement, moves broadside across said second set of rollers, a second side guide associated with said second set of rollers against which the other longitudinal edge of the piece is thus maintained, and a second cutting device, overhanging said second side guide and disposed obliquely thereto, for severing the other front corner of said piece as the latter is carried forward on said second set of conveyor rollers.

15. In the manufacture and conditioning of skelp, the improvement which consists in first cutting the rolled product to the desired lengths, then subjecting the successively cut-off pieces of the rolled product to pointing, cupping and bending operations, and thereafter assembling said pieces in pack formation for cooling.

16. In the manufacture and conditioning of skelp for use in pipe making, the improvement which consists in first cutting the rolled product into desired lengths and then subjecting successively cut-off pieces of the rolled product, prior to their assemblage in pack formation for cooling, to pointing, cupping and bending operations on their front ends, whereby the necessity for breaking up the packs of bars, after cooling, is eliminated.

17. The herein described method for the manufacture and conditioning of skelp for use in pipe making, which consists in subjecting the front end of each piece of the rolled product, as cut off and delivered by a shear, to pointing, cupping and bending operations, then assembling said pieces in pack formation, and finally subjecting said packs of pieces to cooling.

18. In the manufacture and conditioning of skelp, the improvement which consists in subjecting to pointing, cupping and bending operations, the successively cut-off pieces of the rolled product of a skelp bar mill, in the longitudinal travel of said pieces from the cut-off means to a cooling bed or other receiving device.

19. In apparatus of the class described, the combination with means for assembling successively cut-off pieces of skelp in pack formation, of means operable on each piece, between the cut-off means and said assembling means, for pointing, cupping and bending the front end thereof.

20. In apparatus of the class described, a cooling bed for the reception of skelp bar in packs, a shear for cutting off successive pieces of the product of a skelp bar mill, means for assembling in pack formation a plurality of successive pieces delivered by said shear, in the travel of said pieces toward said cooling bed, and means operable on said pieces, before such assemblage, and after said shearing to point, cup and bend their front ends.

21. In apparatus of the class described, a shear for cutting the product of a skelp bar mill, means for assembling successively cut-off longitudinally moving bars in pack formation, in combination with means operable individually on each bar, during its longitudinal movement between said shear and said assembling means, to point, cup and bend its front end.

JOHN W. SHEPERDSON.